June 27, 1950     O. C. OLSON ET AL     2,512,836
SAFETY DRAWBAR
Filed April 30, 1948     2 Sheets-Sheet 1
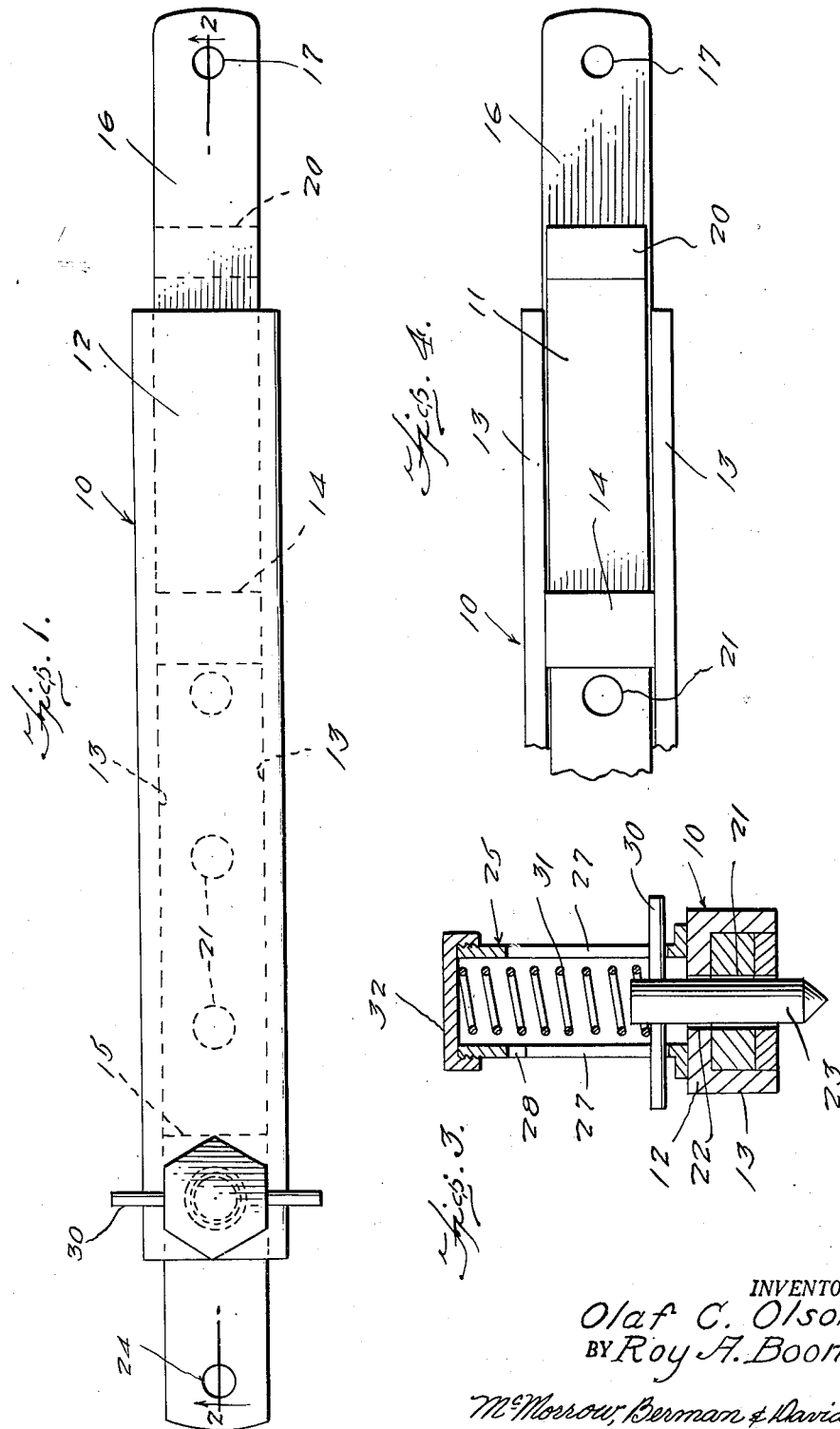
INVENTORS
Olaf C. Olson
BY Roy A. Boomer
McMorrow, Berman & Davidson
ATTORNEYS

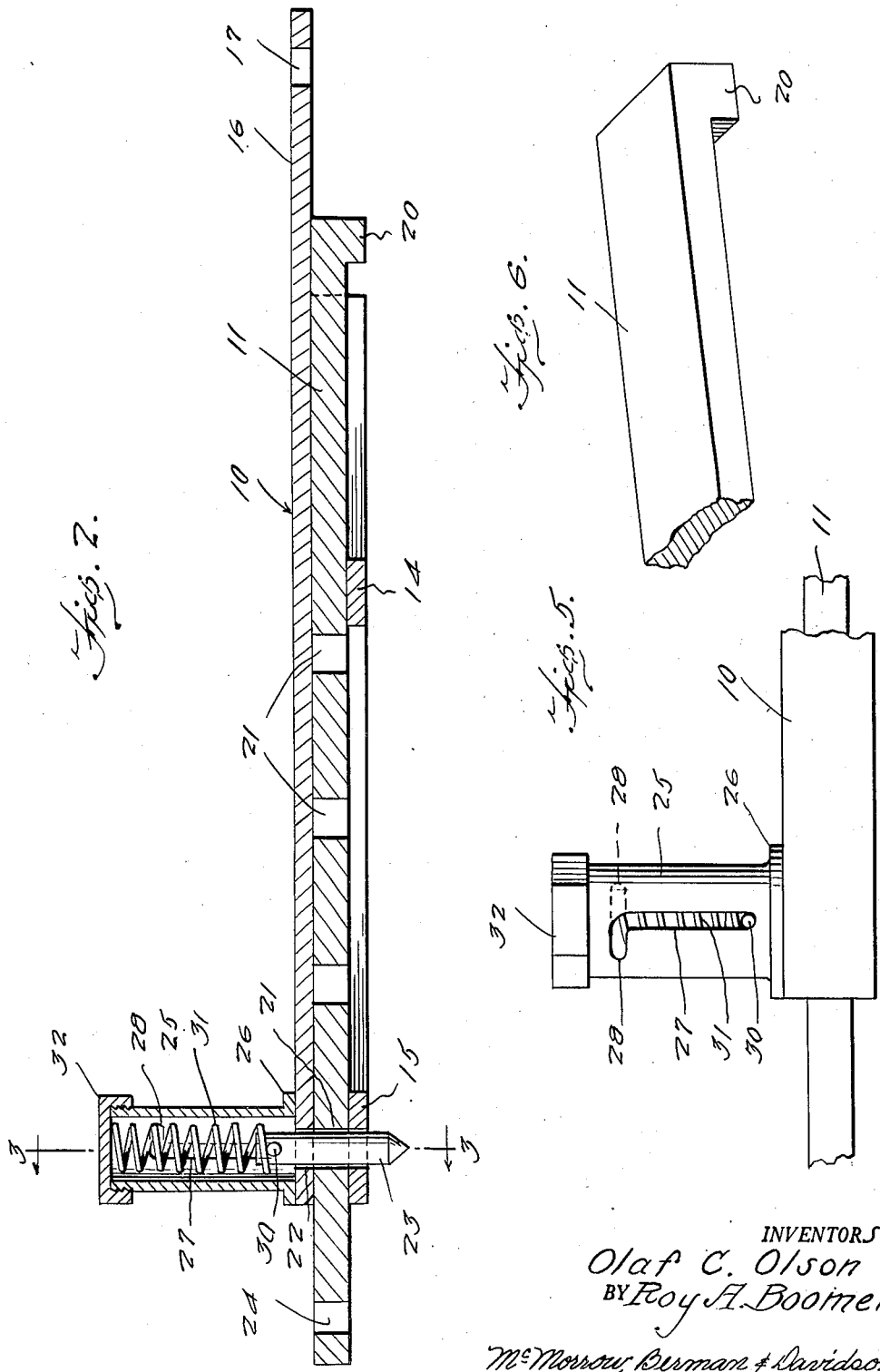

Patented June 27, 1950

2,512,836

UNITED STATES PATENT OFFICE 2,512,836

SAFETY DRAWBAR

Olaf C. Olson and Roy A. Boomer,
Killdeer, N. Dak.

Application April 30, 1948, Serial No. 24,384

1 Claim. (Cl. 280—33.14)

This invention relates to a safety drawbar.

An object of the invention is the provision of a drawbar formed of two sections slidable relative to each other so that one of the sections may be extended manually for attachment to a vehicle to be conveyed while the other section is connected to the tractor, the sections having a telescoping action for housing the vehicle-attaching section in the other section when unemployed with means for retaining the sections adjustably extended or for maintaining them in telescoped relation.

A further object of the invention is the provision of a drawbar formed of two sections slidable relative to each other within reasonable limits, the outer end of one section having connections with a tractor and the outer end of the other section having a removable attaching means for a vehicle to be conveyed. The sections are retained in extended positions relative to each other by a spring-pressed pin which may be moved to and held in an inoperative position by cooperating means on the pin and a housing for the spring-pressed pin. The construction is such that the tractor carrying the composite drawbar may be backed to a position so that the outer end of the second-mentioned section will be disposed at a point adjacent the front of the vehicle to be conveyed with said point falling within the limits of the extension of the sections whereby the second section may be shifted manually for attachment to said vehicle, forward movement of the tractor causing the spring-pressed pin when released to drop into alined passages in both sections for locking the sections temporarily together.

The invention is best understood from a consideration of the following detailed description in connection with the accompanying drawings forming part of the specification. Nevertheless, it is to be understood, the invention is not confined to the disclosure but is susceptible of such changes and modifications as shall define no material departure from the salient features of the invention as expressed in the appended claim.

In the drawings:

Figure 1 is a longitudinal plan view of our safety drawbar,

Figure 2 is a vertical longitudinal section taken along the line 2—2 of Figure 1, Figure 3 is an enlarged transverse vertical section taken along the line 3—3 of Figure 2, Figure 4 is a fragmentary bottom plan view showing portions of the telescoping sections of our drawbar, Figure 5 is an enlarged fragmentary side view of our drawbar showing more particularly a temporary retaining means for connecting the sections together, and Figure 6 is a fragmentary view in perspective of the inner end of one of the sections of the drawbar.

Referring more particularly to the drawings 10 designates one section of a drawbar in which is slidably mounted a second section 11. The section 10 includes a flat elongated bar 12 with side flanges 13 depending from the side edges of said bar. Transverse bars 14 and 15 connect the lower edges of the flanges together at spaced points adjacent the inner and outer ends of said flanges to provide in effect a housing in which the section 11 slides. One end 16 of the bar 12 projects beyond the inner terminus of the flanges 13 and is provided with a perforation or passage 17 to receive a connecting pin (not shown) for attaching said bar to the usual draw plate of a tractor.

The section 11 has a depending lug 20 at one end adapted to engage the bar 14 on the section 10 when the sections are extended to prevent separation of said sections. The section 11 is in the form of a flat metal bar provided with spaced perforations 21 adapted to receive a pin 23 when one of said perforations is alined with a perforation 22 in the section 10. The other end of section 11 has a passage 24 adapted to receive a pin or connecting means (not shown) for attaching said section to a vehicle to be conveyed.

A housing 25 has an annular flange 26 at the open lower end thereof welded to the top face of the section 11 and the vertical axis of the housing is in line with the center of the perforation 22. Diametrically opposite vertical slots 27 are formed in the wall of the vertical housing. Each slot has an offset portion 28 opening into an adjacent vertical slot and disposed at right angles thereto. However, the offset portions are extended in opposite directions. A rod 30 mounted diametrically in a transverse passage in the upper end of the pin 23 has its opposite ends projecting through the vertical slots 27. A coil spring 31 has its lower end seated over the upper end of the pin 23 and in engagement with the rod 30. A cap 32 is threaded onto the upper open end of the housing 25 and maintains the spring under compression.

The operation of our device is as follows: When it is desired to connect a tractor carrying the drawbar to a vehicle to be towed, the tractor is backed up to the vehicle but is stopped at a safe distance from the vehicle to prevent the vehicle from being injured by the drawbar and also more particularly to prevent injury to a party who will make the connections between the two vehicles. The pin 23 will then be raised and locked in an inoperative position to release the section 11 for sliding movement in the section 10. The section 11 is drawn outwardly until the passage 24 is alined with the connecting means on the vehicle to be towed and the section is attached. The pin 23 is released and the spring 31 will force said pin through a perforation 21 in the section 11 for securing the sections together when the sections are adjusted.

In order to lock the pin 23 temporarily in an inoperative position, the projecting ends of the rod 30 are grasped and pulled upwardly against the tension of the spring 31 until the ends of the rod aline with the offset portions 28 of the vertical slots 27. The rod is then revolved clockwise for seating the ends thereof in the offset portions of the slots. The rod 30 and pin 23 are released by turning the rod anti-clockwise. The pin 23 may be placed in any one of the perforations 21.

What we claim:

An adjustable drawbar comprising a housing comprising a longitudinally elongated plate formed on its forward end with means for attachment to a tractor, depending longitudinal side flanges on said plate defining a slide channel therebetween beneath said plate, said flanges having their forward ends spaced rearwardly from the forward end of said plate and extending to the rear end of said plate, a forward transverse member connected to extend between said side flanges at a point substantially spaced rearwardly from the forward ends of said side flanges, said forward transverse member being spaced below said plate, a rearward transverse member connected to extend between said side flanges immediately adjacent to the rear ends of said side flanges and spaced below said plate, a slide bar slidably confined in said slide channel and slidably resting upon said forward and rearward transverse members, a depending stop lug on the forward end of said slide bar for engaging said forward transverse member to stop said slide bar in its extreme rearwardly extended relation to said housing, the rearward end of said slide bar extending rearwardly beyond the rear end of said housing and formed with means of connection to a vehicle to be pulled by the tractor, said slide bar being formed between its forward and rearward ends with a series of longitudinally spaced pin receiving holes, the rearward end of the plate of said first section and said rearward transverse member being formed with vertically aligned holes with which any one of the pin receiving holes of said slide bar is registrable in a selected longitudinal relation of the slide bar relative to said housing, and releasable locking pin means on the rearward end of said housing having a vertically operable pin arranged to be projected through the aligned holes of said first section and a pin receiving hole of said slide bar registered with said aligned holes whereby said slide bar is locked in adjusted relation to said housing, said pin being vertically retractible to free said slide bar for rearward extension of said slidebar relative to said housing to a limit defined by engagement of said depending lug on the slide bar with said forward transverse member of said housing.

OLAF C. OLSON.
ROY A. BOOMER.

REFERENCES CITED

The following references are of record in the file of this patent:

UNITED STATES PATENTS

| Number | Name | Date |
|---|---|---|
| 1,120,132 | Childress | Dec. 8, 1914 |
| 2,140,132 | Hollett | Dec. 13, 1938 |
| 2,179,439 | Trow | Nov. 7, 1939 |
| 2,295,021 | Weiss | Sept. 8, 1942 |
| 2,384,245 | Forney | Sept. 4, 1945 |